United States Patent

Gray

[11] Patent Number: 5,987,310
[45] Date of Patent: Nov. 16, 1999

[54] CELLULAR PHONE

[76] Inventor: Jason D. Gray, 5040 Island Club Dr., Tamarac, Fla. 33319

[21] Appl. No.: 08/670,156

[22] Filed: Jun. 27, 1996

[51] Int. Cl.[6] .................................................. H04B 7/26
[52] U.S. Cl. .............................. 455/90; 455/100; 455/569
[58] Field of Search .................................... 379/433, 428; 455/575, 100, 90, 569

[56] References Cited

U.S. PATENT DOCUMENTS

| Re. 34,976 | 6/1995 | Helferich et al. . |
| 4,875,229 | 10/1989 | Palett et al. . |
| 5,003,576 | 3/1991 | Helferich . |
| 5,046,082 | 9/1991 | Zicker et al. . |
| 5,177,780 | 1/1993 | Kasper . |
| 5,278,892 | 1/1994 | Bolliger et al. . |
| 5,327,486 | 7/1994 | Wolff et al. . |
| 5,659,611 | 8/1997 | Saska ....................................... 379/433 |

FOREIGN PATENT DOCUMENTS 7079278   8/1993   Japan ................. H04B 7/26

*Primary Examiner*—Salvatore Cangialosi
*Attorney, Agent, or Firm*—Chase & Yakimo, L.C.

[57] ABSTRACT

A cellular phone in the form of a glove with a cellular phone assembly incorporated therein. The cellular phone assembly comprises a slim line housing having the cellular phone circuitry therein, the housing attached to the back hand of the glove. A wire extends from the voice output portion of the cellular phone circuitry and along the thumb portion of the glove for connection to a speaker found on the outside of the thumb appendage. A second wire extends from the cellular phone voice input circuitry and along the little finger appendage of the glove for connection to a microphone. The central housing presents the conventional phone buttons on the back hand side of the glove. The glove with the cellular phone incorporated therein allows a user to easily transport and use a cellular phone without interference with the manual dexterity of the gloved hand. In use the gloved thumb with speaker thereon is held near the ear and gloved little finger with microphone thereon is held near the mouth.

12 Claims, 4 Drawing Sheets

CELLULAR PHONE

BACKGROUND OF THE INVENTION

This invention relates to a cellular phone and, more particularly, to a cellular phone adapted to be worn about a hand of the user without diminishing the user's manual dexterity.

The use of mobile cellular phones is a burgeoning one. Heretofore, the use of a cellular phone limits the dexterity of at least one hand of the user. Thus, it is desirable in some cases to have a cellular phone, readily available for use, without interfering with the user's normal manual dexterity.

In response thereto I have invented a cellular phone incorporated into a glove which easily interfaces with the user's preferred hand. A central phone housing is incorporated into the glove which releasably engages the user's hand via the normal hand/glove interface. A phone earpiece and mouthpiece are displaced from the cellular phone housing in the form of a separate speaker and microphone attached to separate fingers of the glove, these elements being wired to the phone circuitry found in the central phone housing. The glove carrier/phone combination enables the user to easily transport the phone and use the same without interfering with the user's manual dexterity.

It is therefore a general object of this invention to provide a cellular phone for wear on a body part of the user.

Another general object of this invention is to provide a cellular phone, as aforesaid, which interfaces with a hand of the user.

Still another object of this invention is to provide a cellular phone, as aforesaid, which does not interfere with the manual dexterity of the user.

A further object of this invention is to provide a cellular phone, as aforesaid, having a glove carrier which is easily fitted about and releasably secured to the hand of the user.

Another object of this invention is to provide a cellular phone, as aforesaid, which is easy to use, aesthetically pleasing and mobile.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 5 is a block diagram showing the relationship between the central phone housing and the displaced speaker and microphone elements.

DESCRIPTION OF THE PREFERRED EMBODIMENT

Figure 1:
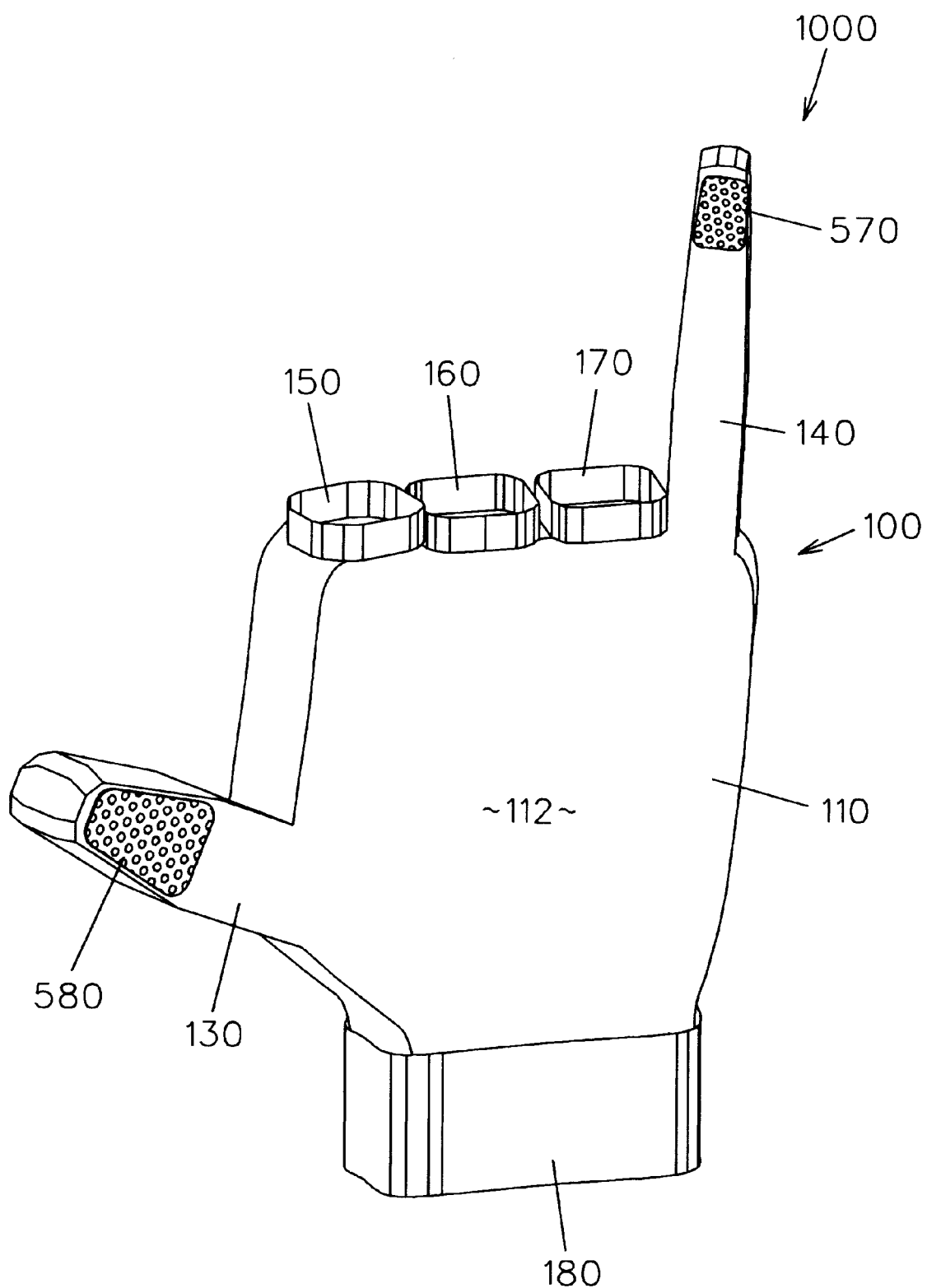
FIG. 1 is a palm side view of the cellular phone.
Figure 2:
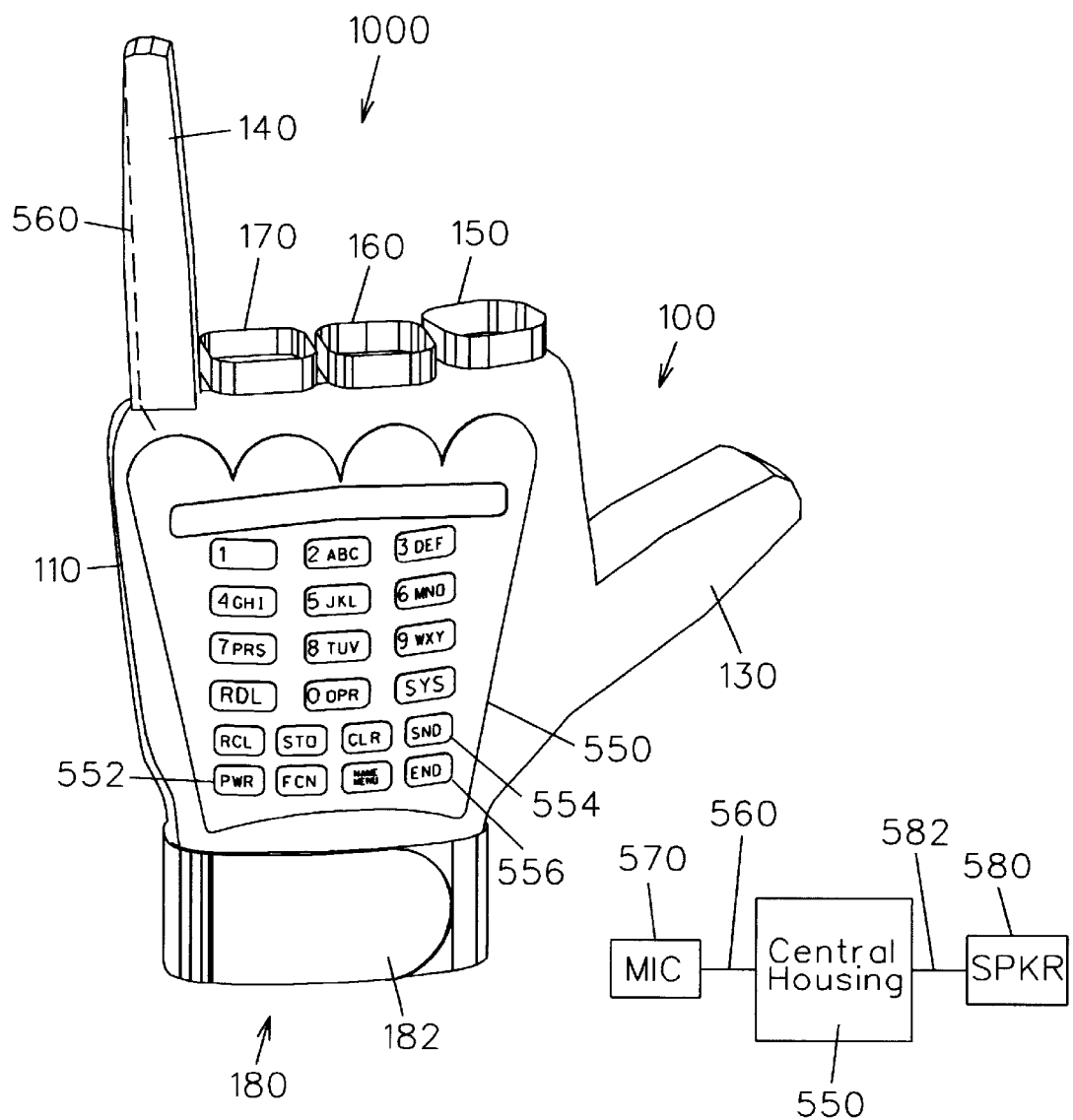
FIG. 2 is a back hand view of the phone of FIG. 1.
Figure 3:
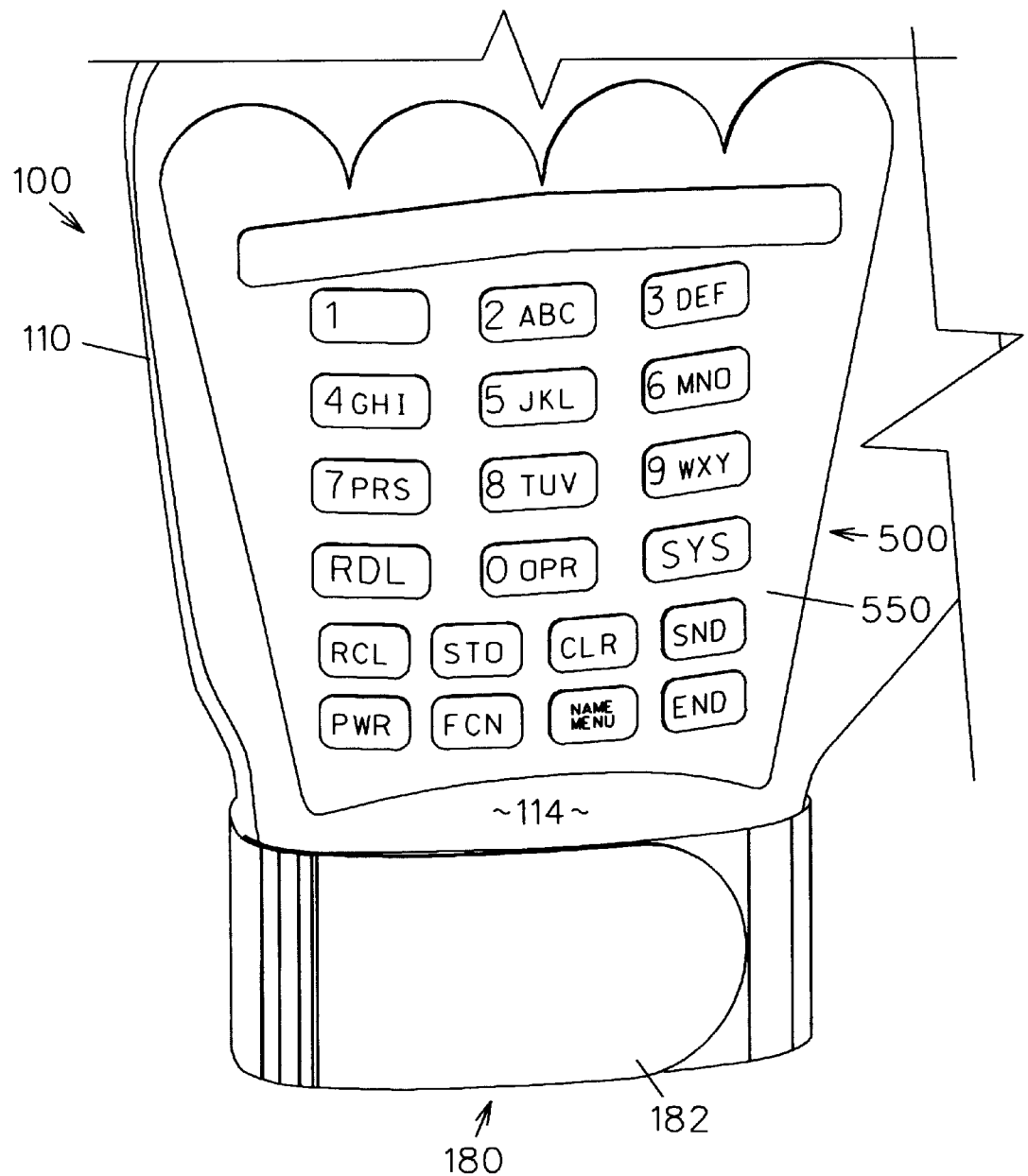
FIG. 3 is a fragmentary back hand view of the cellular phone on an enlarged scale.
Figure 4:
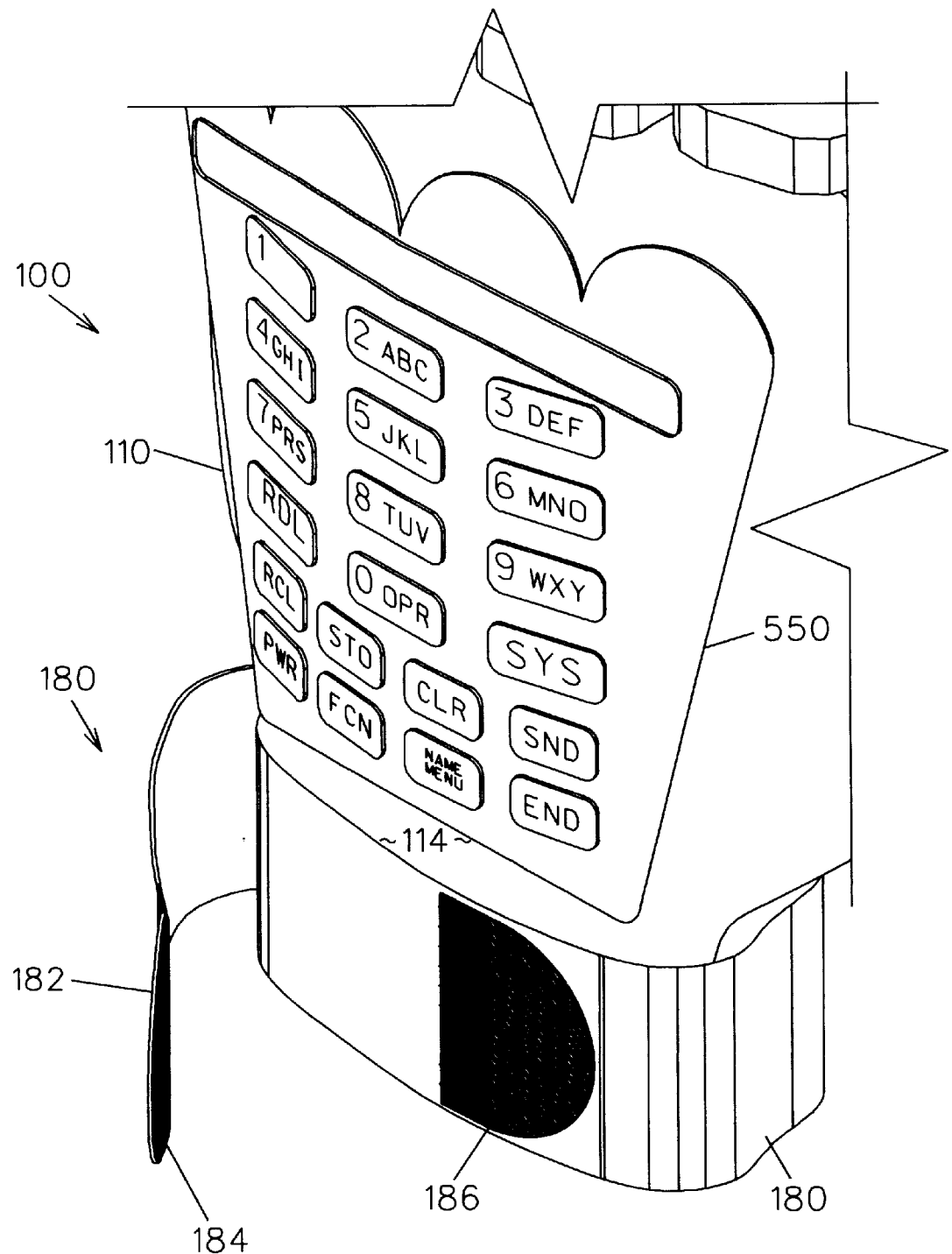
FIG. 4 is a fragmentary perspective view of the glove, on an enlarged scale, showing the fastening strap disengaged from its complementary fastener.

Turning more particularly to the drawings, FIGS. 1–5 show the phone 1000 as comprising a central phone housing 550 carried by a glove 100 for wear about the user's hand.

The glove carrier 100 presents an overall glove configuration and is preferably made of a flexible material so as to snugly conform to the shape of the user's hand without significantly diminishing the user's manual dexterity. Material, similar to that in a golfer's glove, is one type of material which may be utilized.

The glove 100 includes a general body portion 110 including a palm section 112 and back hand section 114. Extending from the body portion 110 of the glove 100 are first and second appendages 130, 140 adapted to respectively receive the thumb and little finger of the user's hand therein. Partial glove appendages 150, 160, 170 also extend from the top of the glove body 110, these appendages presenting openings allowing for extension of the remaining intermediate fingers of the user's hand therethrough. Normal full length appendages may be provided to cover the remaining fingers.

At the bottom edge of the body 110 is a releasable wrist band 180, the wrist band having a flap 182 having a Velcro® fastener 184 thereon. This Velcro® fastener 184 is designed to engage a complementary Velcro® fastener 186 found on the mating portion of the wrist band 180.

Incorporated into or attached to the back hand portion 114 of the glove 100 is a central housing 550. The housing preferably has a slim line profile so as to meld into the back hand portion 114 of the glove. This central housing 550 will include the normal operating circuitry found in a cellular telephone, inclusive of voice input and output circuitry, so as to provide the desired functions of a cellular telephone. However, there is no mouthpiece or earpiece incorporated into the central housing structure as found in conventional cellular phones.

A wire 560 extends from the voice input section of the circuitry in the central housing 550 and along the digital appendage 140. This wire 560 is connected to a microphone 570 which is attached to an end of the digital appendage 140. A speaker 580 is likewise attached to the top of the digital appendage 130 by a wire 582 running therealong and connected to the voice input section of the central housing 550 circuitry. Accordingly, the speaker 580 presents an earpiece, as in the normal cellular telephone, with the microphone 570 presenting the mouthpiece thereof.

As shown, the central housing 550 presents a plurality of user-operable buttons allowing for the provision of phone functions, including the 0–9 dialing buttons, power on buttons 552, send button 554 of the dialed telephone number and end button 556 for the telephone conversation. It is desired that the telephone 1000 in cooperation with the cellular phone system also presents the following capabilities:

A. A user identification function to insure authorized use either through code, voice identification or caller I.D.
 B. Voice mail.
 C. Voice activated dialing and message retrieval.
 D. Different ring patterns for different incoming numbers.
 E. Modem interface capabilities.
 F. Reception and transmission of messages to and from a computer.
 G. Wireless data link between phone and lap top and/or PC organizer.
 H. AC/DC adapter features.
 I. Versatility of worldwide access and format features for worldwide usage.
 J. Digital voice masking capabilities.
 K. Solar power capabilities.
 L. Capable of being programmed by a computer to have multiple phones on the same number or as a two-way radio.

M. Capable of being attached to a speaker unit and being used as a speaker phone.
N. Programmable voice message and reminder capabilities.
O. Programmable internal identification of incoming calls to block unwanted calls.
P. A braille key pad to be used by the blind for all phone functions.
Q. Capable of being modified for the hearing impaired by enlarging the view screen or by being hooked to a personal or pocket size computer.
R. Have a scanner detection circuit that would transmit and receive on various frequencies.
S. Internal voice mail with flashing LED and a display screen. Also a menu driven/alphanumeric display with name and number memory with plenty of standby and talk time.
T. An out-of-range warning device for traveling on the road.
U. Able to program the phone to have a ring on or ring off mode.

In use the glove 100 is positioned on the user's hand, left hand as shown, such that the control housing 550 is on the back hand of the user with the microphone 570 and speaker 580 elements being on the palm side thereof. To place or receive a call the user operates the buttons of the control housing 550 in manner identical to that of the conventional cellular phone. During actual phone use the microphone 570 serves as the mouthpiece with the speaker 580 serving as the ear piece, such functions being provided by the user holding his/her gloved thumb to the ear and gloved little finger to the mouth in a manner identical to a person mimicking the use of a phone.

Accordingly, it can be seen that the phone 1000, as above described, presents the above-mentioned advantages and results. The use of the specially designed glove 100 as a carrier for the phone 550 housing does not interfere with the manual dexterity of the user. Thus the phone is constantly available to the user.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by letters patent is as follows:

1. A cellular phone comprising:
   a central housing having circuitry therein for providing phone communication between a cellular phone user and a second phone user;
   a glove made of a flexible material for wear about a hand of the cellular phone user, said housing fastened to a back hand portion of said glove;
   a first appendage extending from said glove adapted to receive a thumb of the cellular phone user therein;
   a speaker attached to said first appendage, an insertion of the user's thumb into said first appendage extending said first appendage and speaker thereon into a position for user placement of said speaker near a user's ear during use of the phone;
   means in said glove for connecting said speaker to a voice output portion of the cellular phone circuitry;
   a second appendage extending from said glove adapted to receive a little finger of the cellular phone user therein;
   a microphone attached to said second appendage, an insertion of the user's little finger into said second appendage extending said second appendage and microphone thereon into a position for user placement of said microphone near a user's mouth during use of the phone;
   means in said glove for connecting said microphone to a voice input portion of the cellular phone circuitry.

2. The cellular phone as claimed in claim 1 wherein said speaker connecting means comprises a wire extending between said voice output section of the cellular phone circuitry and said speaker.

3. The cellular phone as claimed in claim 1 wherein said microphone connecting means comprises a wire extending between said microphone and said voice input portion of said cellular phone circuitry.

4. The cellular phone as claimed in claim 1 further comprising a plurality of apertures in said glove for allowing extension of said remaining fingers of a cellular phone user's hand therethrough.

5. The cellular phone as claimed in claim 1 wherein said speaker is attached to said first appendage on a side of said glove opposed from said central housing.

6. The cellular phone as claimed in claim 1 wherein said microphone is attached to said second appendage on a side of said glove opposed from said central housing.

7. A cellular phone comprising:
   a central housing having circuitry therein for providing phone communication between a cellular phone user and a second phone user;
   a glove for wear about a hand of the cellular phone user, said housing fastened to a portion of said glove;
   a first appendage extending from said glove, said first appendage adapted to receive a user's finger therein;
   a speaker attached to said first appendage of said glove;
   means in said glove for connecting said speaker to a voice output portion of the cellular phone circuitry;
   a microphone attached to a portion of said glove;
   means for connecting said microphone to a voice input of the cellular phone circuitry.

8. The cellular phone as claimed in claim 7 wherein the finger in said first appendage is a thumb of the cellular phone user.

9. The cellular phone as claimed 8 wherein said microphone is attached to a second appendage of said glove, said second appendage adapted to receive a cellular user's finger therein.

10. The cellular phone as claimed 9 wherein the user's finger in said second appendage is the user's little finger.

11. A cellular phone comprising:
   a central housing having cellular phone circuitry therein for providing phone communication between a cellular phone user and a second phone user;
   a glove made of a flexible material for wear about a hand of the cellular phone user, said housing fastened to a portion of said glove;
   a first appendage extending from said glove adapted to receive a thumb of the cellular phone user therein;
   a speaker attached to said first appendage, an extension of the user's thumb into said first appendage guiding said first appendage and speaker thereon into a position relative to the other fingers of the hand for placement of the thumb and said speaker near a user's ear during use of the phone;
   means in said glove for connecting said speaker to a voice output portion of the cellular phone circuitry;
   a second appendage extending from said glove adapted to receive a little finger of the cellular phone user therein, an extension of the user's little finger into said second appendage guiding said second appendage and microphone thereon into a position relative to the other fingers of the hand for placement of the little finger and said speaker near a user's mouth during use of the phone;

a microphone attached to said second appendage;

means in said glove for connecting said microphone to a voice input of the cellular phone circuitry; and means on said glove for extension of the remaining fingers of the cellular phone user's hands therethrough.

12. A cellular phone comprising:

a central housing having cellular phone circuitry therein for providing phone communication between a cellular phone user and a second phone user;

a glove made of a flexible material for wear about a hand of the cellular phone user, said housing fastened to a portion of said glove;

a first appendage extending from said glove adapted to receive a first digit of the cellular phone user therein;

a speaker attached to said first appendage, an extension of the user's first digit into said first appendage guiding said first appendage and speaker thereon into a position relative to the other digits of the hand for placement of the first digit and said speaker near a user's ear during use of the phone;

means in said glove for connecting said speaker to a voice output portion of the cellular phone circuitry;

a second appendage extending from said glove adapted to receive a second digit of the cellular phone user therein, an extension of the user's second digit into said second appendage guiding said second appendage and microphone thereon into a position relative to the other digits of the hand for placement of the second digit and said speaker near a user's mouth during use of the phone;

a microphone attached to said second appendage;

means in said glove for connecting said microphone to a voice input of the cellular phone circuitry; and means on said glove for extension of the remaining digits of the cellular phone user's hands therethrough.

* * * * *

UNITED STATES PATENT AND TRADEMARK OFFICE
CERTIFICATE OF CORRECTION

PATENT NO.  : 5,987,310
DATED       : November 16, 1999
INVENTOR(S) : Jason D. Gray It is certified that error appears in the above-identified patent and that said Letters Patent is hereby corrected as shown below:

Column 5, line 5, delete "said speaker" and substitute --a microphone--.

Column 6, lines 14-15, delete "said speaker" and substitute --a microphone--.

Signed and Sealed this

First Day of August, 2000

Attest:

Q. TODD DICKINSON

Attesting Officer

Director of Patents and Trademarks